(12) United States Patent
Miyazaki

(10) Patent No.: US 7,859,718 B2
(45) Date of Patent: Dec. 28, 2010

(54) IMAGE OUTPUT DEVICE, COLOR CORRECTION METHOD, AND COMPUTER READABLE MEDIUM STORING PROGRAM FOR COLOR CORRECTION

(75) Inventor: Koichi Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1148 days.

(21) Appl. No.: 11/510,572

(22) Filed: Aug. 28, 2006

(65) Prior Publication Data
US 2007/0070371 A1 Mar. 29, 2007

(30) Foreign Application Priority Data
Sep. 26, 2005 (JP) .............................. 2005-277990

(51) Int. Cl.
H04N 1/60 (2006.01)
G03F 3/08 (2006.01)
H04N 1/46 (2006.01)
G06K 9/00 (2006.01)
(52) U.S. Cl. .................. 358/1.9; 358/518; 358/520; 358/523; 358/524; 358/529; 382/162; 382/167
(58) Field of Classification Search ................ 358/1.9, 358/406, 523, 529, 518, 520, 524; 347/15; 382/162, 167
See application file for complete search history.

(56) References Cited

U.S. PATENT DOCUMENTS 5,764,387 A * 6/1998 Yamada ..................... 358/525
7,339,704 B2 * 3/2008 Mestha et al. ................ 358/1.9
7,411,697 B2 * 8/2008 Kuno ......................... 358/1.9

FOREIGN PATENT DOCUMENTS

| JP | A-08-116456 | 5/1996 |
|---|---|---|
| JP | A 11-252386 | 9/1999 |
| JP | A-2000-278547 | 10/2000 |
| JP | B2-3513334 | 1/2004 |
| JP | A-2005-094551 | 4/2005 |
| JP | A-2005-175585 | 6/2005 |
| JP | A-2005-176003 | 6/2005 |

OTHER PUBLICATIONS

Japanese Office Action issued Mar. 15, 2010 for Japanese Patent Application No. 2005-277990 (with translation).

\* cited by examiner

*Primary Examiner*—Charlotte M Baker
(74) *Attorney, Agent, or Firm*—Oliff & Berridge, PLC

(57) ABSTRACT

An image output device includes: a color conversion processing unit that converts output-use image data into image data of a standard CMYK color space; and a color correction processing unit that conducts color correction of the image data of the standard CMYK color space outputted from the color conversion processing unit, wherein the color correction processing unit includes a K correcting unit that conducts correction of the K component of the image data and a CMY correcting unit that conducts correction of the CMY components of the image data.

21 Claims, 4 Drawing Sheets

IMAGE OUTPUT DEVICE, COLOR CORRECTION METHOD, AND COMPUTER READABLE MEDIUM STORING PROGRAM FOR COLOR CORRECTION

BACKGROUND

1. Technical Field

The present invention relates to an image output device, color correction method, and computer readable medium storing a program for color correction, and in particular, for example, to calibration in a color image output device such as a color printer.

2. Related Art

In an output device such as an electrophotographic printer, calibration is ordinarily conducted in order to alleviate individual differences and temporal changes in regard to color and density reproducibility. Usually, TRC correction, which independently corrects the colors of cyan (C), magenta (M), yellow (Y), and black (K), is conducted as the calibration.

SUMMARY

According to an aspect of the invention, there is provided an image output device including: a color conversion processing unit that converts output-use image data into image data of a standard CMYK color space; and a color correction processing unit that conducts color correction of the image data of the standard CMYK color space outputted from the color conversion processing unit, wherein the color correction processing unit includes a K correcting unit that conducts correction of the K component of the image data and a CMY correcting unit that conducts correction of the CMY components of the image data.

BRIEF DESCRIPTION OF THE DRAWINGS

Exemplary embodiments of the invention will be described in detail based on the following figures, wherein.

DETAILED DESCRIPTION

Exemplary embodiments of the invention will be described in detail below with reference to the drawings.

Figure 1:
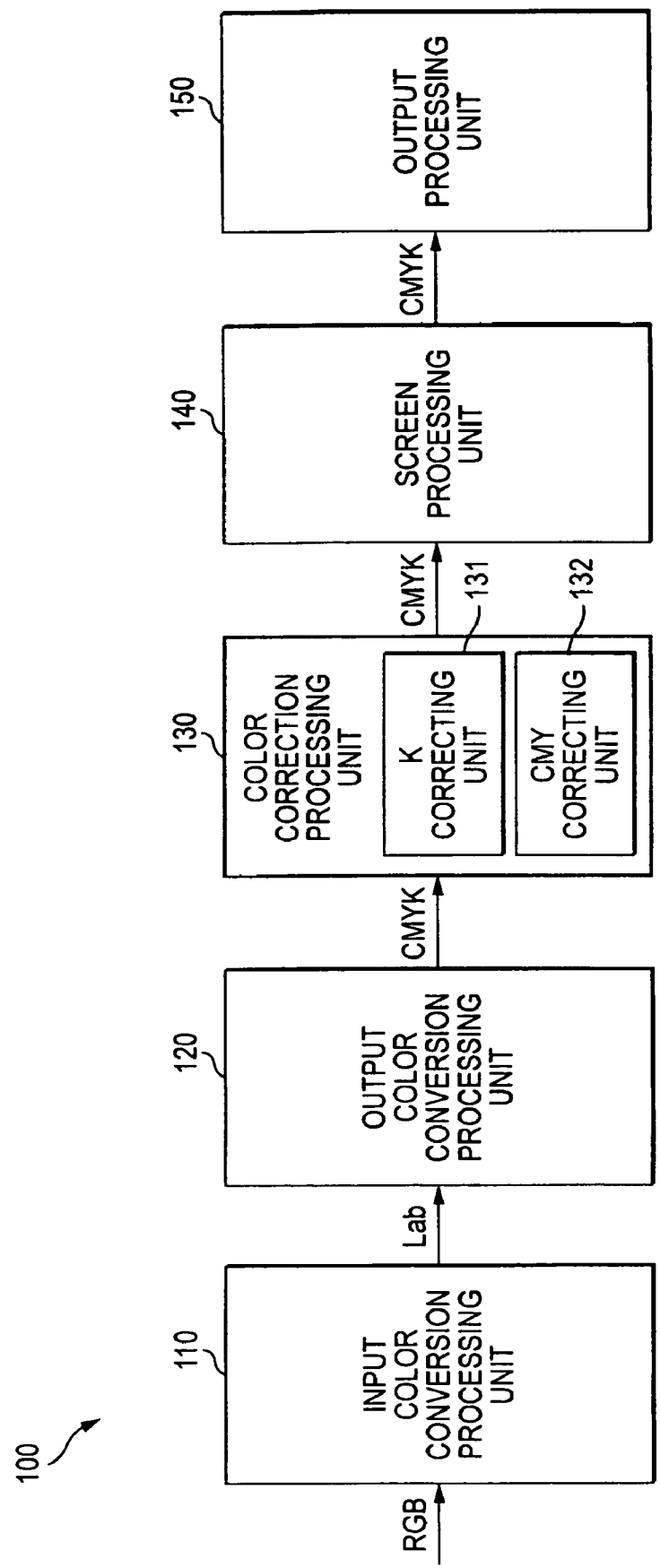
FIG. 1 is a diagram showing the configuration of an output device according to an aspect of the invention.

FIG. 1 is a diagram showing the configuration of an output device 100 according to an aspect of the present invention.

As shown in FIG. 1, an output device 100 includes an input color conversion processing unit 110, an output color conversion processing unit 120, a color correction processing unit 130, a screen processing unit 140, and an output processing unit 150. The color correction processing unit 130 includes a K correcting unit 131 and a CMY correcting unit 132.

The input color conversion processing unit 110 conducts color conversion processing with respect to output-use image data sent from a connected computer or the like. More specifically, the input color conversion processing unit 110 utilizes a predetermined input profile to convert image data of an input color space (e.g., RGB) into image data of a profile connection space (PCS) (e.g., CIE-L*a*b*; this will be notated below simply as "Lab"). That is, the input color conversion processing unit 110 conducts conversion from a device-dependent color space to a devise-independent color space.

The output color conversion processing unit 120 conducts color conversion processing with respect to the image data converted to PCS by the input color conversion processing unit 110. More specifically, the output color conversion processing unit 120 utilizes the standard output profile of the output device to convert the image data of PCS (e.g., Lab) into image data of a CMYK color space. That is, the output color conversion processing unit 120 conducts conversion from a device-independent color space to a device-dependent color space (color space dependent on the output device 100). The "standard output profile" is a profile that describes the characteristics of the "standard machine" of the output device 100 at the time of factory shipment.

The color correction processing unit 130 conducts correction of the colors of the image data in order to compensate for temporal changes in color reproducibility. The color correction processing unit 130 conducts different color correction between the K component and the CMY components of the image data. That is, the K correcting unit 131 conducts ordinary TRC correction in regard to the K component of the image data and the CMY correcting unit 132 conducts color conversion (standard CMY→real machine CMY) in regard to the CMY components. The K correcting unit 131 is configured by a one-dimensional lookup table (LUT) that stores a corrected K component value in an address corresponding to the K component value of the image data delivered from the output color conversion processing unit 120. The CMY correcting unit 132 is configured by a three-dimensional LUT that stores corrected CMY component values in addresses corresponding to the CMY component values of the image data delivered from the output color conversion processing unit 120.

By conducting color correction of the CMY components by three-dimensional table conversion, overprint characteristics resulting from the three colors of CMY can be corrected even if there are temporal changes in color reproducibility. In other words, chromatic colors resulting from the three colors of CMY can be accurately corrected including not just primary colors but secondary colors and tertiary colors. Further, unbalance of gray balance can also be corrected because overprint characteristics resulting from the three colors of CMY are corrected in regard to gray colors resulting from the three colors of CMY—that is, process gray.

It will be noted that, in regard to the K component, correction of the single color of K is conducted by conducing TRC correction. Colors comprising the K component and a chromatic color including at least one color of the CMY components cannot be accurately corrected because their overprint characteristics cannot be measured, but the single color of K and the three colors of CMY can be compensated for at a level where there are no practical problems because they are individually corrected. Similarly, gray colors comprising K and a gray color (process gray) resulting from the three colors of CMY cannot be accurately corrected because their overprint characteristics are not measured, but the gray balance of process gray resulting from the three colors of CMY can be compensated for at a level where there are no practical problems including the quality of the gray balance even with respect to combinations with K because it is compensated for.

The screen processing unit 140 conducts screen processing (halftone processing) with respect to the image data of the CMYK color space outputted from the color correction processing unit 130.

The output processing unit 150 conducts ordinary output processing with respect to paper (recording medium) on the basis of the binary image data of the CMYK color space outputted from the screen processing unit 140, and is disposed with a photoconductor, a charge device, an exposure device, a development device, a fixing device, and a cleaning device, for example.

Next, the operation of the output device 100 having the above configuration will be described.

When the output device 100 receives output-use image data from a connected computer or the like, first, the input color conversion processing unit 110 utilizes a predetermined input profile to convert the image data of the input color space (e.g., RGB) into image data of PCS (e.g., Lab).

Next, the output color conversion processing unit 120 utilizes the standard output profile of the output device to convert the image data of PCS (e.g., Lab) into image data of a CMYK color space.

Next, the color correction processing unit 130 separately conducts, between the K component and the CMY components, color correction of the image data in order to compensate for temporal changes in color reproducibility. That is, the K correcting unit 131 conducts ordinary TRC correction in regard to the K component of the image data, and the CMY correcting unit 132 conducts color conversion (standard CMY→real machine CMY) in regard to the CMY components.

Next, the screen processing unit 140 conducts screen processing (halftone processing) with respect to the image data of the CMYK color space outputted from the color correction processing unit 130.

Finally, the output processing unit 150 conducts ordinary output processing with respect to the paper on the basis of the binary image data of the CMYK color space outputted from the screen processing unit 140.

By conducting the above processing, it may be possible to correct unbalance of the gray balance resulting from temporal changes in color reproducibility.

Next, a method of creating a CMY conversion table utilized in the color conversion in the CMY correcting unit 132 will be described.

Figure 2:
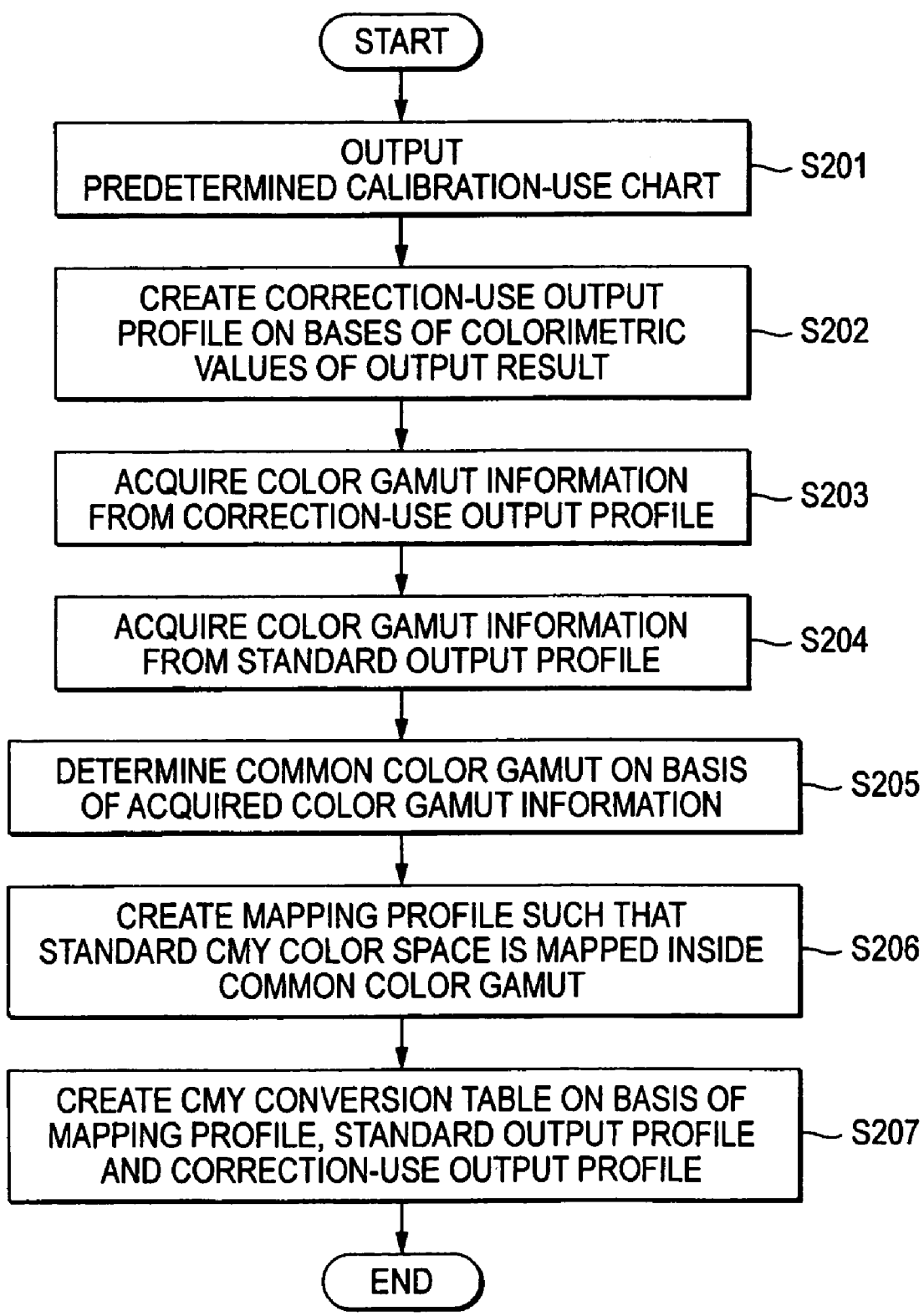
FIG. 2 is a diagram showing the flow of creation processing of a CMY conversion table in an output device 100.

FIG. 2 is a diagram showing the flow of creation processing of the CMY conversion table in the output device 100.

As shown in FIG. 2, first, the output device 100 outputs a predetermined calibration-use chart (S201). The calibration-use chart is a chart, for example, including plural patches where the respective density values of CMY have been appropriately changed to mix colors and plural patches where the density value of the single color of K has been appropriately changed. Assuming that six types of density values have been respectively selected for CMYK, the total number of patches becomes 6×6×6+6=222 patterns.

Next, the output result of the calibration-use chart is colorimetered by a calorimeter, and a correction-use output profile that describes the relationship between the current CMY and the colors on PCS is created on the basis of the calorimetric values (S202).

Next, the current color gamut information of the output device 100 is acquired from the created correction-use output profile (S203).

Next, the standard (e.g., "standard machine" at the time of factory shipment) color gamut information of the output device 100 is acquired from the standard output profile (S204). At this time, first, a standard output profile in regard to the three colors of CMY is generated from the standard output profile in regard to the four colors of CMYK, and the color gamut information is acquired from the standard output profile in regard to those three colors of CMY.

Next, on the basis of the acquired two sets of color gamut information, the color gamut that is common to both is determined (S205).

Next, a mapping profile for mapping the CMY color space of the standard state (e.g., "standard machine" at the time of factory shipment) inside the common color gamut is created (S206). It will be noted that in the mapping method at this time, colors included in the common color gamut in the CMY color space of the standard state are converted to corrected three colors of CMY using the output profile of the currently reproducible three colors of CMY, so that it is ensured that the colors do not change. After colors outside the common color gamut are mapped to colors inside the common color gamut having minimum color difference, they are converted to the corrected three colors of CMY using the output profile of the currently reproducible three colors of CMY.

Finally, the CMY conversion table is created on the basis of the created mapping profile, the standard output profile in regard to the three colors of CMY, and the correction-use output profile (S207).

In this manner, a CMY conversion table that describes the relationship between standard CMY and current CMY (corrected CMY) is created. By conducting color conversion using the CMY conversion table created in this manner, it may be possible to control shifting with the color gamut in the standard state even when temporal changes arise in the color gamut of the output device 100.

Next, another exemplary embodiment of an output device according to the present invention will be described. In the present exemplary embodiment, the output device is disposed with plural (specifically, two) output processing units. Additionally, the output device realizes two-sided printing by conducting printing on the front side of paper with one of the output processing units and conducting printing on the back side of paper with the other output processing unit.

Figure 3:
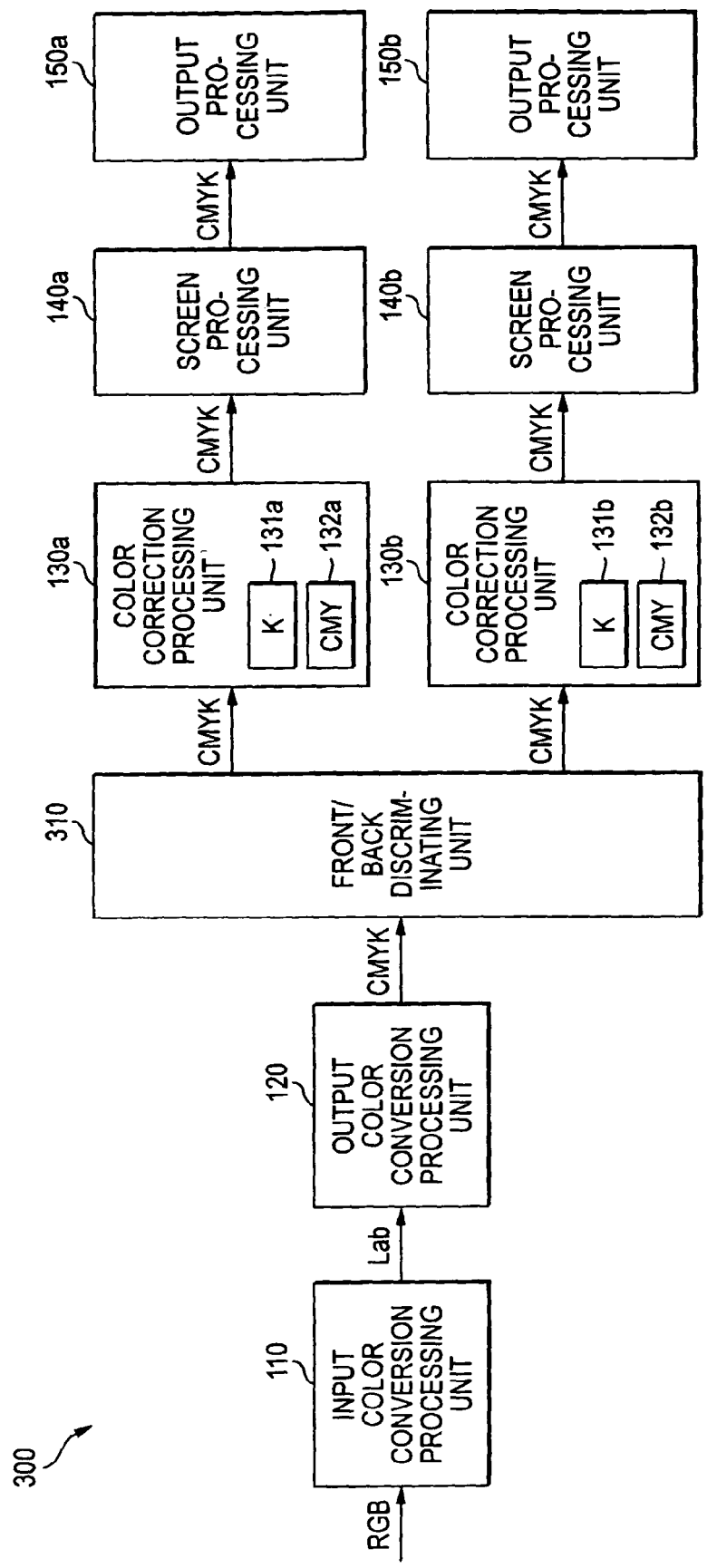
FIG. 3 is a diagram showing the configuration of another output device according to an aspect of the invention.

FIG. 3 is a diagram showing the configuration of another output device according to an aspect of the present invention. It will be noted that, in FIG. 3, the same reference numerals are given to constituent elements that are the same as those shown in FIG. 1.

As shown in FIG. 3, an output device 300 according to an aspect of the present invention includes an input color conversion processing unit 110, an output color conversion processing unit 120, a front/back discriminating unit 310, two color correction processing units 130a and 130b, two screen processing units 140a and 140b, and two output processing units 150a and 150b. The color correction processing unit 130a includes a K correcting unit 131a and a CMY correcting unit 132a, and the color correction processing unit 130b includes a K correcting unit 131b and a CMY correcting unit 132b.

The input color conversion processing unit 110 and the output color conversion processing unit 120 are the same as the previously mentioned input color conversion processing unit 110 and the output color conversion processing unit 120, so detailed description thereof will be omitted.

The front/back discriminating unit 310 discriminates whether the image data is for output to the front side of the paper or is for output to the back side of the paper. The front/back discriminating unit 310 outputs image data for the front side to the color correction processing unit 130a and outputs image data for the back side to the color correction processing unit 130b.

The color correction processing unit 130a conducts color correction processing with respect to the image data for the front side outputted from the front/back discriminating unit 310. More specifically, the color correction processing unit 130*a* conducts correction of the K component of the image data for the front side by the K correcting unit 131*a* and conducts correction of the CMY components of the image data for the front side by the CMY correcting unit 132*a*. It will be noted that the configurations of the K correcting unit 131*a* and the CMY correcting unit 132*a* are the same as those of the previously mentioned K correcting unit 131 and the CMY correcting unit 132, so detailed description thereof will be omitted.

Similarly, the color correction processing unit 130*b* conducts color correction processing with respect to the image data for the back side outputted from the front/back discriminating unit 310. More specifically, the color correction processing unit 130*b* conducts correction of the K component of the image data for the back side by the K correcting unit 131*b* and conducts correction of the CMY components of the image data for the back side by the CMY correcting unit 132*b*. It will be noted that the configurations of the K correcting unit 131*b* and the CMY correcting unit 132*b* are the same as those of the previously mentioned K correcting unit 131 and the CMY correcting unit 132, so detailed description thereof will be omitted The screen processing unit 140*a* conducts screen processing (halftone processing) with respect to the image data for the front side outputted from the color correction processing unit 130*a*. The screen processing unit 140*b* conducts screen processing (halftone processing) with respect to the image data for the back side outputted from the color correction processing unit 130*b*.

The output processing unit 150*a* conducts ordinary output processing with respect to the front side of the paper on the basis of the binary image data for the front side outputted from the screen processing unit 140*a*. The output processing unit 150*b* conducts ordinary output processing with respect to the back side of the paper on the basis of the binary image data for the back side outputted from the screen processing unit 140*b*. The output processing units 150*a* and 150*b* are disposed with a photoconductor, a charge device, an exposure device, a development device, a fixing device, and a cleaning device, for example.

Next, the operation of the output device 300 having the above configuration will be described.

When the output device 300 receives output-use image data from a connected computer or the like, first, the input color conversion processing unit 110 utilizes a predetermined input profile to convert the image data of the input color space (e.g., RGB) into image data of PCS (e.g., Lab).

Next, the output color conversion processing unit 120 utilizes the standard output profile of the output device to convert the image data of PCS (e.g., Lab) into image data of a CMYK color space.

Next, the front/back discriminating unit 310 discriminates whether the image data is for output to the front side of the paper or is for output to the back side of the paper. The front/back discriminating unit 310 outputs image data for the front side to the color correction processing unit 130*a* and outputs image data for the back side to the color correction processing unit 130*b*.

Next, the color correction processing unit 130*a* conducts color correction processing with respect to the image data for the front side outputted from the front/back discriminating unit 310. That is, the K correcting unit 131*a* conducts correction of the K component of the image data for the front side, and the CMY correcting unit 132*a* conducts correction of the CMY components of the image data for the front side.

Similarly, the color correction processing unit 130*b* conducts color correction processing with respect to the image data for the back side outputted from the front/back discriminating unit 310. That is, the K correcting unit 131*b* conducts correction of the K component of the image data for the back side, and the CMY correcting unit 132*b* conducts correction of the CMY components of the image data for the back side.

Next, the screen processing units 140*a* and 140*b* conduct screen processing (halftone processing) with respect to the image data for the front side and the back side outputted from the color conversion processing units 130*a* and 130*b*.

Finally, the output processing units 150*a* and 150*b* conduct ordinary output processing with respect to the front side and the back side of the paper on the basis of the binary image data for the front side and the back side outputted from the screen processing units 140*a* and 140*b*.

By conducting the above processing, it may be possible to correct unbalance of the gray balance resulting from temporal changes in color reproducibility.

Next, a method of creating CMY conversion tables utilized in the color conversion in the CMY correcting units 132*a* and 132*b* will be described.

Figure 4:
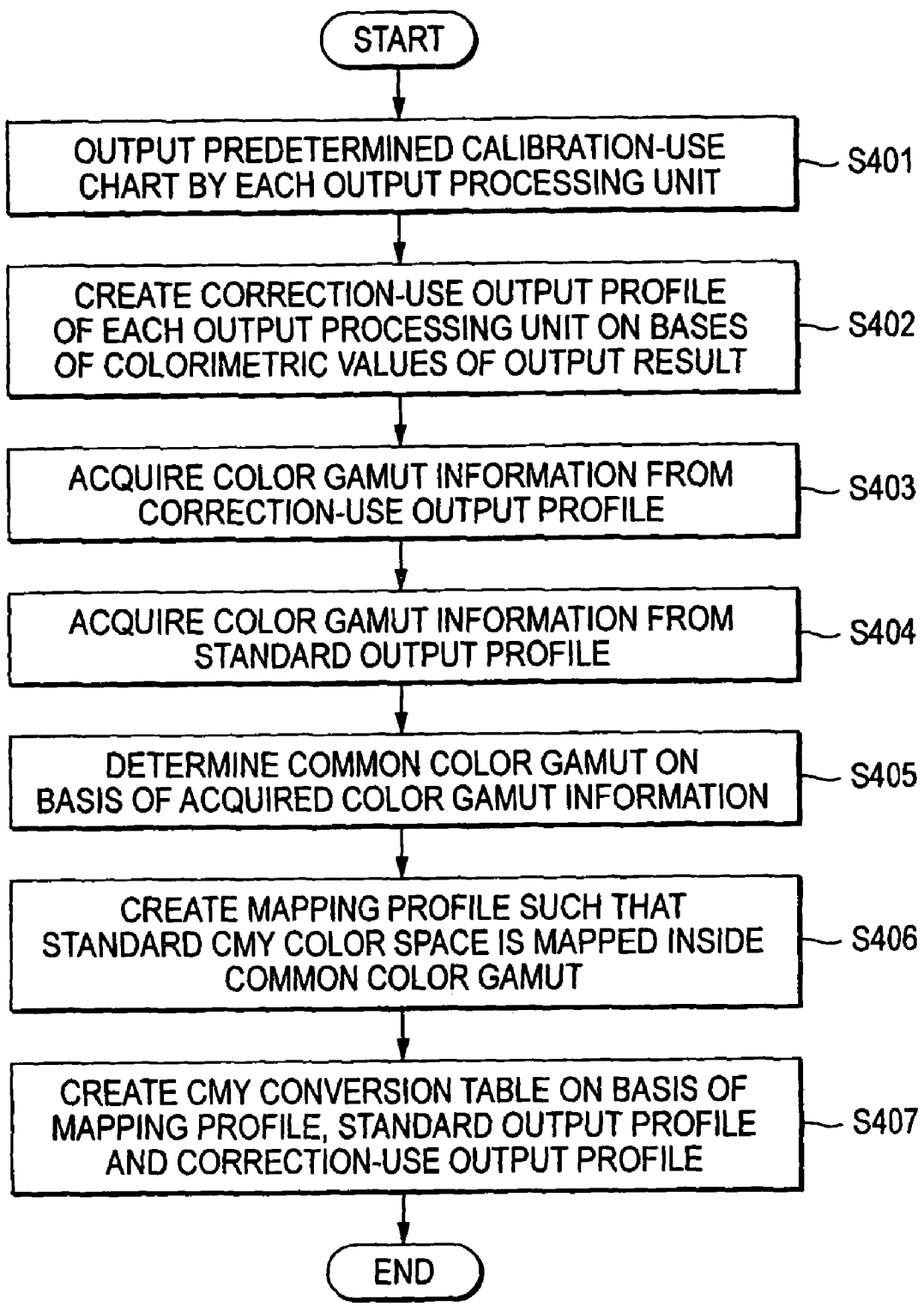
FIG. 4 is a diagram showing the flow of creation processing of CMY conversion tables in an output device 300.

FIG. 4 is a diagram showing the flow of creation processing of the CMY conversion tables in the output device 300.

As shown in FIG. 4, first, the output processing units 150*a* and 150*b* with which the output device 300 is disposed output predetermined calibration-use charts (S401).

Next, the output results of the calibration-use charts are colorimetered by a calorimeter, and correction-use output profiles that describe the relationship between the current CMY and the colors on PCS are created for each of the output processing units 150*a* and 150*b* on the basis of the colorimetric values (S402).

Next, the current color gamut information of each of the output processing units 150*a* and 150*b* is acquired from the created correction-use output profiles (S403).

Next, the standard color gamut information of the output device 300 is acquired from the standard output profile (S404). At this time, first, a standard output profile in regard to the three colors of CMY is generated from the standard output profile in regard to the four colors of CMYK, and the color gamut information is acquired from the standard output profile in regard to those three colors of CMY.

Next, on the basis of the acquired plural sets of color gamut information, the common color gamut that is common to all is determined (S405).

Next, a mapping profile for mapping the CMY color space of the standard state inside the common color gamut is created (S406). It will be noted that, in the mapping method at this time, colors included in the common color gamut in the CMY color space of the standard state are converted, separately between the front side and back side, to corrected three colors of CMY using the output profile of the currently reproducible three colors of CMY. After colors outside the common color gamut are mapped to colors inside the common color gamut having minimum color difference, they are converted to the corrected three colors of CMY using the output profile of the currently reproducible three colors of CMY separately between the front side and the back side.

Finally, CMY conversion tables for each of the output processing units 150*a* and 150*b* are created on the basis of the created mapping profile, the standard output profile in regard to the three colors of CMY, and each of the correction-use output profiles (S407). More specifically, the CMY conversion tables are created by mapping the standard CMY in the common color gamut using the standard output profile and the mapping profile and converting the standard CMY to correction-use CMY of each of the output processing units 150a and 150b using the correction-use output profiles for each of the output processing units 150a and 150b.

In this manner, CMY conversion tables that describe the relationship between standard CMY and current CMY (corrected CMY) are created. By conducting color conversion using the CMY conversion tables created in this manner, it may be possible to control shifting with the color gamut in the standard state even when temporal changes arise in the color gamut of the output device 300. Moreover, it may be possible to cause the color reproductions of the output results of the output processing units 150a and 150b to match even when the color gamuts are different between the output processing units 150a and 150b.

Consequently, the output device 300 can correct color differences and changes between an image outputted to the front side of the paper and an image outputted to the back side even when the color gamut of the output processing unit 150a that conducts output processing with respect to the front side of the paper and the color gamut of the output processing unit 150b that conducts output processing with respect to the back side of the paper are mutually different and accompanied by temporal changes. In other words, because the output device 300 corrects color differences and changes resulting from differences in the color gamuts of the output processing units 150a and 150b and temporal changes in the color gamuts, a computer or the like connected to the output device 300 can output to the both sides of the paper an image where color differences and changes have been corrected via the output device 300 by sending to the output device 300 standard CMYK image data regardless of differences in the color gamuts of the output processing units 150a and 150b and temporal changes in the color gamuts.

Further, the output device 300 may be configured such it allocates either the output processing unit 150a or 150b per paper and outputs images to one side or both sides of the paper.

Exemplary embodiments of the present invention have been described above, but embodiments of the present invention are of course not limited to those that have been described above. For example, the input color conversion processing unit 110 and the output color conversion processing unit 120 become unnecessary in the output device when, in a computer or the like that generates output-use image data and transmits the output-use image data to the output device, the standard output profile of the output device is used to conduct conversion to image data of a CMYK color space dependent on the output device.

The foregoing description of the exemplary embodiments of the present invention has been provided for the purposes of illustration and description. It is not intended to be exhaustive or to limit the invention to the precise forms disclosed obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image output device comprising:
   a color conversion processing unit that converts output-use image data into image data of a standard CMYK color space; and
   a color correction processing unit that conducts color correction of the image data of the standard CMYK color space outputted from the color conversion processing unit,
   wherein the color correction processing unit includes a K correcting unit that conducts correction of the K component of the image data and a CMY correcting unit that conducts correction of the CMY components of the image data in a distinct way from the K correcting unit.

2. The image output device of claim 1, wherein the CMY correcting unit is configured by a CMY conversion table that conducts color conversion from standard CMY to corrected CMY.

3. The image output device of claim 2, wherein
   the CMY conversion table is created on the basis of a correction-use output profile, a mapping profile, and a standard output profile,
   the correction-use output profile is created on the basis of colorimetric values of an output result of a predetermined calibration-use chart, and
   the mapping profile is created on the basis of the correction-use output profile and the standard output profile.

4. An image output device disposed with a plurality of output processing units, the image output device comprising:
   a color conversion processing unit that converts output-use image data into image data of a standard CMYK color space;
   a discriminating unit that discriminates whether the image data is for output by any of the output processing units; and
   a plurality of color correction processing units that conduct color correction of the image data of the standard CMYK color space for output by each of the output processing units,
   wherein each of the plurality of color correction processing units includes a K correcting unit that conducts correction of the K component of the image data and a CMY correcting unit that conducts correction of the CMY components of the image data.

5. The image output device of claim 4, wherein the CMY correcting unit is configured by a CMY conversion table that conducts color conversion from standard CMY to corrected CMY.

6. The image output device of claim 5, wherein
   the CMY conversion table is created on the basis of a plurality of correction-use output profile, a mapping profile, and a standard output profile,
   each one of the plurality of correction-use output profile is created per output processing unit on the basis of colorimetric values of an output result of a predetermined calibration-use chart, and
   the mapping profile is created on the basis of the plurality of correction-use output profile and the standard output profile.

7. An image output device that receives image data of a standard CMYK color space and conducts output of the image data, the image output device comprising:
   a color correction processing unit that conducts color correction of the image data of the standard CMYK color space,
   wherein the color correction processing unit includes a K correcting unit that conducts correction of the K component of the image data and a CMY correcting unit that conducts correction of the CMY components of the image data.

8. The image output device of claim 7, wherein the CMY correcting unit is configured by a CMY conversion table that conducts color conversion from standard CMY to corrected CMY.

9. The image output device of claim 8, wherein
the CMY conversion table is created on the basis of a correction-use output profile, a mapping profile, and a standard output profile,
the correction-use output profile is created on the basis of colorimetric values of an output result of a predetermined calibration-use chart, and
the mapping profile is created on the basis of the correction-use output profile and the standard output profile.

10. An image output device disposed with a plurality of output processing units that receive image data of a standard CMYK color space and conduct output of the image data, the image output device comprising:
a discriminating unit that discriminates whether the image data is for output by any of the output processing units; and
a plurality of color correction processing units that conduct color correction of the image data of the standard CMYK color space with respect to the plural output processing units,
wherein each of the plurality of color correction processing units includes a K correcting unit that conducts correction of the K component of the image data and a CMY correcting unit that conducts correction of the CMY components of the image data.

11. The image output device of claim 10, wherein the CMY correcting unit is configured by a CMY conversion table that conducts color conversion from standard CMY to corrected CMY.

12. The image output device of claim 11, wherein
the CMY conversion table is created on the basis of a correction-use output profile, a mapping profile, and a standard output profile,
the correction-use output profile is created per output processing unit on the basis of colorimetric values of an output result of a predetermined calibration-use chart, and
the mapping profile is created on the basis of the correction-use output profile and the standard output profile.

13. The image output device of claim 10, wherein the discriminating unit discriminates such that any of the output processing units conducting output with respect to a front side of a recording medium and any of the output processing units conducting output with respect to a back side of a recording medium are different.

14. The image output device of claim 10, wherein the discriminating unit discriminates per recording medium.

15. A color correction method, comprising:
conducting a first color correction for a K component of an image data by a first correction process, the image data being defined in a standard CMYK color space; and
conducting a second color correction for a CMY component of the image data by a second correction process, the second correction process being distinct from the first correction process.

16. The color correction method of claim 15,
wherein the first correction process includes a TRC correction.

17. The color correction method of claim 15,
wherein the second correction process includes a color conversion from a standard CMY to a real machine CMY.

18. A computer readable medium storing a program causing a computer to execute a process for a color correction, the process comprising:
conducting a first color correction for a K component of an image data by a first correction process, the image data being defined in a standard CMYK color space; and
conducting a second color correction for a CMY component of the image data by a second correction process, the second correction process being distinct from the first correction process.

19. The computer readable medium of claim 18,
wherein the first correction process includes a TRC correction.

20. The computer readable medium of claim 18,
wherein the second correction process includes a color conversion from a standard CMY to a real machine CMY.

21. The image output device of claim 1,
wherein the K correcting unit conducts a TRC correction.

* * * * *